(12) United States Patent
Oshima et al.

(10) Patent No.: US 7,147,682 B2
(45) Date of Patent: *Dec. 12, 2006

(54) POLISHING COMPOSITION (75) Inventors: Yoshiaki Oshima, Wakayama (JP);
Kazuhiko Nishimoto, Wakayama (JP);
Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 10/726,581

(22) Filed: Dec. 4, 2003

(65) Prior Publication Data

US 2004/0127146 A1    Jul. 1, 2004

(30) Foreign Application Priority Data

Dec. 26, 2002    (JP)    .............................. 2002-377321
Dec. 26, 2002    (JP)    .............................. 2002-377390

(51) Int. Cl.
*C09G 1/02*    (2006.01)
*C09G 1/04*    (2006.01)
*B24B 1/00*    (2006.01)

(52) U.S. Cl. ............................. 51/308; 106/3; 438/692; 438/693

(58) Field of Classification Search .................. 51/308; 106/3; 438/692, 693
See application file for complete search history.

(56) References Cited

U.S. PATENT DOCUMENTS 6,551,175 B1    4/2003    Koichi et al.
2001/0017007 A1    8/2001    Hagihara et al.
2002/0194789 A1*    12/2002    Oshima ........................ 51/308
2003/0110711 A1    6/2003    Ota et al.
2004/0040217 A1    3/2004    Takashina et al.
2004/0127147 A1*    7/2004    Suenaga et al. .............. 451/36

FOREIGN PATENT DOCUMENTS

| EP | 0773270 A3 | 5/1997 |
| EP | 1123956 A1 | 8/2001 |
| JP | 9-193004 A | 7/1997 |
| JP | 2001-323254 A | 11/2001 |
| JP | 2002-030274 A | 1/2002 |
| JP | 2003-230587 A | 8/2003 |

* cited by examiner

*Primary Examiner*—Michael Marcheschi
(74) *Attorney, Agent, or Firm*—Birch, Stewart, Kolasch & Birch, LLP (57) ABSTRACT A polishing composition for a substrate for memory hard disk comprising water and silica particles, wherein the silica particles have a particle size distribution in which the relationship of a particle size (R) and a cumulative volume frequency (V) in a graph of particle size-cumulative volume frequency obtained by plotting a cumulative volume frequency (%) of the silica particles counted from a small particle size side against a particle size (nm) of the silica particles satisfies the above formula (1) and the above formula (2), and wherein a particle size at 90% of a cumulative volume frequency (D90) is within the range of 65 nm or more and less than 105 nm. By using the polishing composition of the present invention, there can be efficiently manufactured an Ni—P plated substrate for a disk polished to have an excellent surface smoothness, in which the micropits are effectively reduced.

6 Claims, 3 Drawing Sheets

POLISHING COMPOSITION

This Non-provisional application claims priority under 35 U.S.C. § 119(a) on patent application Ser. No(s). 2002-377390 and 2002-377321 filed in Japan on Dec. 26, 2002, respectively, the entire contents of which are hereby incorporated by reference.

FIELD OF THE INVENTION

The present invention relates to a polishing composition for a substrate for memory hard disk, a polishing process for a substrate for memory hard disk with the polishing composition, in which generation of carrier squeals and/or micropits is suppressed, and a process for manufacturing a substrate for memory hard disk with the polishing composition.

BACKGROUND OF THE INVENTION

In recent memory hard disk drives, high storage capacity and miniaturization have been demanded. In order to increase the recording density, it has been strongly urged to lower flying height of a magnetic head and to reduce the unit recording area. Along with this trend, the surface quality required after polishing has become severely assessed every year even in a process for manufacturing a substrate for memory hard disk (hereinafter referred to as "substrate for a disk"), so that the surface roughness and the sizes and depths of waviness allowed have been becoming increasingly small.

In order to meet such requirements, there has been proposed a polishing composition containing silica particles as abrasive particles having a specified particle size distribution (see, for instance, Japanese Patent Laid-Open No. 2002-30274).

It is disclosed in the publication that according to the above-mentioned polishing composition, since colloidal silica particles having different mono-modal number particle size distributions are contained, an aluminum disk substrate having small average waviness and a few surface defects can be obtained.

In addition, there has been known a polishing composition containing colloidal silicas having a specified particle size distribution, which has excellent surface smoothness, whereby polishing can be carried out at an economical rate without generating surface defects (see, for instance, Japanese Patent Laid-Open No. 2001-323254).

However, there are some cases in the polishing composition where squeaky noises or vibrations from the surroundings of the holder (carrier) of the substrate for a disk are generated when the substrate for a disk is polished using a polishing machine (hereinafter this phenomenon being referred to as "carrier squeals"). Therefore, the surface defects (scratches) have been rather increased, thereby leading to lowering of the surface smoothness of the substrate for a disk.

In addition, in the polishing composition, there has not been any contrivances in a case where alumina abrasive grains are used as primary polishing, from the viewpoint of preventing defects of pits which are caused by the alumina abrasive grains remaining on the substrate surface (hereinafter referred to as "micropits"). Therefore, further improvements have been desired.

The term "micropits" as referred to herein is surface defects which differ from usual pits in that the micropits cannot be clearly detected as a bright spot with a differential interference optical microscope, so that the defects have not conventionally been satisfactorily studied. Therefore, the micropits have been recently rapidly recognized as surface defects for substrates which hinder the miniaturization of the unit recording area.

SUMMARY OF THE INVENTION

The present invention relates to:

[1] a polishing composition for a substrate for memory hard disk containing water and silica particles, wherein the silica particles have a particle size distribution in which a relationship of a particle size (R) and a cumulative volume frequency (V) in a graph of particle size-cumulative volume frequency obtained by plotting a cumulative volume frequency (%) of the silica particles counted from a small particle size side against a particle size (nm) of the silica particles, the particle size being determined by observation with a transmission electron microscope (TEM), satisfies the following formula (1):

$$V \leq 2 \times (R-5) \quad (1)$$

in a range of particle sizes of from 5 to 40 nm, and the following formula (2):

$$V \geq 0.5 \times (R-20) \quad (2)$$

in a range of particle sizes of from 20 to 40 nm, and wherein a particle size at 90% of a cumulative volume frequency (D90) is within a range of 65 nm or more and less than 105 nm;

[2] a polishing composition for a substrate for memory hard disk containing an abrasive in an aqueous medium, wherein the abrasive contains silica particles having particle sizes of from 5 to 120 nm in an amount of 50% by volume or more, wherein the abrasive contains:

(i) 10 to 70% by volume of small size silica particles having particle sizes of 5 nm or more and less than 40 nm based on the entire amount of the silica particles having particle sizes of from 5 to 120 nm;

(ii) 20 to 70% by volume of intermediate size silica particles having particle sizes of 40 nm or more and less than 80 nm based on the entire amount of the silica particles having particle sizes of from 5 to 120 nm; and (iii) 0.1 to 40% by volume of large size silica particles having particle sizes of 80 nm or more and 120 nm or less based on the entire amount of the silica particles having particle sizes of from 5 to 120 nm;

[3] a polishing process for a substrate for memory hard disk with suppressed generation of carrier squeals, including the step of polishing a substrate for memory hard disk with the polishing composition of the above [1];

[4] a method of reducing micropits of a substrate, including the step of applying the polishing composition of the above [2] to a substrate to be polished;

[5] a method for manufacturing a substrate for memory hard disk, including the step of polishing an Ni—P plated substrate for memory hard disk with the polishing composition of the above [1];

[6] a method for manufacturing a substrate for memory hard disk, including the step of polishing an Ni—P plated substrate for memory hard disk with the polishing composition of the above [2];

[7] an Ni—P plated substrate for memory hard disk obtained by polishing a substrate to be polished with the polishing composition of the above [1]; and

[8] an Ni—P plated substrate for memory hard disk obtained by polishing a substrate to be polished with the polishing composition of the above [2].

DETAILED DESCRIPTION OF THE INVENTION

All publications cited herein are hereby incorporated by reference.

The present invention relates to a polishing composition for a substrate for a disk, with which a substrate for a disk having excellent surface smoothness is efficiently obtained in which the generation of carrier squeals is suppressed and micropits are significantly reduced; a polishing process for a substrate for a disk with the polishing composition, in which generation of carrier squeals and/or micropits is suppressed; and a process for manufacturing a substrate for a disk with the polishing composition.

These and other advantages of the present invention will be apparent from the following description.

1. Polishing Composition

The polishing composition of the present invention is a polishing composition for a substrate for a disk, which can be roughly classified, for instance, into the following two embodiments on the bases of the particle size distribution of the silica particles used as an abrasive.

(Embodiment 1)

A polishing composition for a substrate for a disk containing water and silica particles, wherein the silica particles have a particle size distribution in which a relationship of a particle size (R) and a cumulative volume frequency (V) in a graph of particle size-cumulative volume frequency obtained by plotting a cumulative volume frequency (%) of the silica particles counted from a small particle size side against a particle size (nm) of the silica particles, the particle size being determined by observation with a transmission electron microscope (TEM), satisfies the following formula (1):

$$V \leq 2 \times (R-5) \quad (1)$$

in a range of particle sizes of from 5 to 40 nm, and the following formula (2):

$$V \geq 0.5 \times (R-20) \quad (2)$$

in a range of particle sizes of from 20 to 40 nm, and wherein a particle size at 90% of a cumulative volume frequency (D90) is within a range of 65 nm or more and less than 105 nm.

(Embodiment 2)

A polishing composition for a substrate for a disk containing an abrasive in an aqueous medium, wherein the abrasive contains silica particles having particle sizes of from 5 to 120 nm in an amount of 50% by volume or more, wherein the abrasive contains:

(i) 10 to 70% by volume of small size silica particles having particle sizes of 5 nm or more and less than 40 nm based on the entire amount of the silica particles having particle sizes of from 5 to 120 nm;

(ii) 20 to 70% by volume of intermediate size silica particles having particle sizes of 40 nm or more and less than 80 nm based on the entire amount of the silica particles having particle sizes of from 5 to 120 nm; and (iii) 0.1 to 40% by volume of large size silica particles having particle sizes of 80 nm or more and 120 nm or less based on the entire amount of the silica particles having particle sizes of from 5 to 120 nm.

The silica particles used in Embodiment 1 have a specified particle size distribution such that the relationship of a particle size (R) and a cumulative volume frequency (V) in the graph of particle size-cumulative volume frequency obtained by plotting a cumulative volume frequency (%) of the silica particles counted from a smaller particle size side against a particle size (nm) of the silica particles satisfies the above-mentioned formula (1) in a range of particle sizes of from 5 to 40 nm and the above-mentioned formula (2) in a range of particle sizes of from 20 to 40 nm, and wherein a particle size of a cumulative volume frequency (D90) is within a range of 65 nm or more and less than 105 nm, wherein the graph of particle size-cumulative volume frequency shows the particle size distribution of the silica particles. One of the great features of Embodiment 1 resides in that the polishing composition contains the silica particles as an abrasive. Since the abrasive has the above constitution, according to the polishing composition of this embodiment, the generation of carrier squeals can be suppressed during the polishing process, and a substrate for a disk having an excellent surface smoothness without micropits can be efficiently obtained.

When the substrate for a disk is polished with a polishing machine, the substrate is loaded into a holder (carrier) set between upper and lower platens, in an eccentric position. With the progress of the polishing, the carrier squeals may be generated in the surroundings of the carrier in some cases. In general, the carrier squeals are markedly generated when polished with the polishing composition containing a large amount of abrasive particles having particle sizes of 40 nm or less. When the generation of carrier squeals is a slight degree, a squeaking noise is generated intermittently or continuously, but when it is severe degree, the entire polishing machine starts to vibrate and polishing step has to be interrupted.

In any case, if the carrier squeals are generated, the polishing of a substrate for a disk is carried out unevenly, so that the surface defects (scratches) are increased, thereby leading to the lowering of the surface smoothness of a substrate for a disk.

The term "micropits" refers to (1) a pit which can be observed only in a state where the surface of a substrate is sufficiently planarized, when observed with a differential interference optical microscope at a magnification of from 50 to 100 times; or (2) a pit which can be observed as an inverted cone shape having a diameter of from 0.2 to 5 μm and a depth of from 10 to 100 nm, when observed with an atomic force microscope, wherein (3) Al element is detected at bottom of the pit. The detection of Al elements can be confirmed by combining a scanning electron microscope (SEM) and elementary analysis technique (EDS: energy-dispersive X-ray spectroscopy, and Auger electron spectroscopy).

It is thought that the micropits are generated for the following reasons. As the average particle size of the abrasive becomes smaller, the mechanical polishing power becomes deficient, so that the residuals such as stuck alumina abrasive grains in a previous process are less likely to be discharged, whereby those discharged in the later stage of the polishing process are not polished and remain as pits.

The silica particles used in Embodiment 1 include, for instance, colloidal silica particles, fumed silica particles, the surface-modified silica particles, and the like. Among them, the colloidal silica particles are preferable, from the viewpoint of giving a surface of the substrate for a disk higher smoothness. The colloidal silica particles can be commercially available ones, for instance, which are generated from an aqueous sodium silicate by a known preparation process. The silica particles are preferable used in the form of a slurry.

The particle size distribution of the above-mentioned silica particles is determined by a method described below. Specifically, the photographs of the silica particles observed by a transmission electron microscope "JEM-2000 FX" commercially available from JEOL LTD. (80 kV, magnification: 10000 to 50000) are incorporated into a personal computer as image data with a scanner connected thereto. The equivalent diameter of each silica particle is determined using an analysis software "WinROOF" (commercially available from MITANI CORPORATION), and considered as the diameter of the silica particles. After analyzing data for 1000 or more silica particles, the volume of the silica particles are calculated from the diameters of the silica particles based on the analyzed data using a spreadsheet software "EXCEL" (commercially available from Microsoft Corporation).

Based on the data for the particle size distribution of the silica particles obtained as mentioned above, a ratio of particles having a given particle size (% based volume) is expressed as cumulative frequency counted from a small particle size side in the entire particles, and a cumulative volume frequency (%) is obtained.

Based on the data for the particle sizes of the silica particles and the data for the cumulative volume frequency of the silica particles obtained as mentioned above, a graph of particle size-cumulative volume frequency is obtained by plotting the cumulative volume frequency against the particle size.

In the above-mentioned graph of particle size-cumulative volume frequency, the silica particles used in Embodiment 1 are:
(a) those having a particle size distribution, in which the relationship of the cumulative volume frequency (V) and the particle size (R) satisfies the above-mentioned formula (1) in the range of particle sizes of from 5 to 40 nm; and
(b) those having a particle size distribution in which the relationship of the cumulative volume frequency (V) and the particle size (R) satisfies the above-mentioned formula (2) in the range of particle sizes of from 20 to 40 nm.

In Embodiment 1, since the silica particles used as an abrasive have a particle size distribution satisfying the above-mentioned (a), the generation of carrier squeals can be suppressed in the polishing process of a substrate for a disk. On the other hand, since the silica particles have a particle size distribution satisfying the above-mentioned (b), the micropits can be effectively reduced, and high polishing rate can also be obtained.

Among them, it is preferable that the relationship of the cumulative volume frequency (V) and the particle size (R) satisfies the formula (3):

$$V \leq 2 \times (R-10) \quad (3)$$

in the range of particle sizes of from 5 to 40 nm, more preferably satisfying the formula (4):

$$V \leq 2 \times (R-15) \quad (4)$$

from the viewpoint of suppressing the generation of carrier squeals.

Among them, it is preferable that the relationship of the cumulative volume frequency (V) and the particle size (R) satisfies the formula (5):

$$V \geq 0.7 \times (R-10) \quad (5)$$

in the range of particle sizes of from 20 to 40 nm, more preferably satisfying the formula (6):

$$V \geq 0.9 \times (R-15) \quad (6)$$

from the viewpoint of reducing the micropits.

Furthermore, the above-mentioned silica particles have a particle distribution that the silica particles have particle sizes at 90% of a cumulative volume frequency (D90) within the range of 65 nm or more and less than 105 nm. Since D90 is 65 nm or more, the micropits are effectively reduced. On the other hand, since D90 is less than 105 nm, high polishing rate can be obtained. D90 is preferably within the range of from 70 to 105 nm, more preferably within the range of from 75 to 105 nm, from the viewpoint of exhibiting the desired effects of the present invention.

The method for adjusting the particle size distribution of the silica particles is not particularly limited. For instance, in the case where the silica particles are colloidal silica, the method includes a method including the step of giving the particle size distribution in a final product by adding the particles which can serve as a new core during the process of particle growth in the preparation steps, or the method including the step of mixing two or more silica particles that have different particle size distributions.

As the abrasive, the abrasives that are generally used for polishing can be used in addition to the above-mentioned silica particles. The abrasive includes metals; carbides of metals or metalloids, nitrides of metals or metalloids, oxides of metals or metalloids and borides of metals or metalloids; diamond, and the like. The elements for metals or metalloids include those elements belonging to the Group 2A, 2B, 3A, 3B, 4A, 4B, 5A, 6A, 7A or 8 of the Periodic Table (long period form). Concrete examples of the abrasives include aluminum oxide, silicon carbide, diamond, magnesium oxide, zinc oxide, titanium oxide, cerium oxide, zirconium oxide and the like. It is preferable to use one or more kinds of these abrasives from the viewpoint of increasing the polishing rate. Among them, aluminum oxide, cerium oxide, zirconium oxide and titanium oxide are suitable for polishing a substrate for precision parts, such as substrates for magnetic recording media. As to aluminum oxide, various crystal systems such as α, θ and γ are known, and they can properly be used and selected as occasion demands.

The average primary particle size of the abrasive other than the silica particles is 200 nm or less. The average primary particle size is preferably 1 nm or more, more preferably 10 nm or more, even more preferably 20 nm or more, from the viewpoint of increasing the polishing rate, and the average primary particle size is 200 nm or less, preferably 150 nm or less, more preferably 120 nm or less, even more preferably 100 nm or less, from the viewpoint of reducing the surface roughness (Ra, Rmax) and the waviness (Wa). The average primary particle size is preferably from 1 to 200 nm, more preferably from 1 to 150 nm, even more preferably from 10 to 120 nm, even more preferably from 20 to 100 nm. Further, when the primary particles are aggregated to form a secondary particle, the average secondary particle size is preferably from 50 to 3000 nm, more preferably from 100 to 1500 nm, even more preferably from 200 to 1200 nm, from the viewpoint of increasing the polishing rate, and from the viewpoint of reducing the surface roughness of an object to be polished in the same manner as above.

The average primary particle size of the abrasive other than the silica particles can be obtained by analyzing the images observed with a scanning electron microscope (magnification: preferably from 3000 to 100000 times), and determining a particle size at 50% counted from a smaller particle size side of the primary particles in a cumulative particle size distribution on a number base (D50). Here, one primary particle size is defined as an arithmetic means of major axis length and minor axis length of the particle. In addition, the average secondary particle size can be determined as a volume-average particle size by using a laser beam diffraction method.

The content of the abrasive containing silica particles is preferably 0.5% by weight or more, more preferably 1% by weight or more, even more preferably 3% by weight or more, even more preferably 5% by weight or more, of the polishing composition of Embodiment 1, from the viewpoint of increasing the polishing rate, and the content is preferably 20% by weight or less, more preferably 15% by weight or less, even more preferably 13% by weight or less, even more preferably 10% by weight or less, of the polishing composition of Embodiment 1, from the viewpoint of improving the surface quality and from the viewpoint of having economic advantages. Accordingly, the content is preferably from 0.5 to 20% by weight, more preferably from 1 to 15% by weight, even more preferably from 3 to 13% by weight, even more preferably from 5 to 10% by weight, of the polishing composition of Embodiment 1.

In addition, since the polishing composition of Embodiment 1 further contains at least one member selected from the group consisting of acids, salts thereof and oxidizing agents, more excellent effects of the present invention can be exhibited. These can be used as a mixture.

It is preferable that the polishing composition of Embodiment 1 contains an oxidizing agent from the viewpoint of further increasing the polishing rate. The oxidizing agent includes peroxides, permanganic acid or salts thereof, chromic acid or salts thereof, peroxo acid or salts thereof, oxyacid or salts thereof, metal salts, sulfuric acid, and the like.

The above-mentioned peroxide includes hydrogen peroxide, sodium peroxide, barium peroxide, and the like; the permanganic acid or salts thereof include potassium permanganate, and the like; the chromic acid or salts thereof include metal salts of chromic acid, metal salts of dichromic acid, and the like; the peroxo acid or salts thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chloric acid, bromic acid, iodic acid, sodium hypochlorate, calcium hypochlorate, and the like; metal salts include iron (III) chloride, iron (III) sulfate, iron (III) citrate, ammonium iron (III) sulfate, and the like. The preferred oxidizing agent is hydrogen peroxide, iron (III) nitrate, peracetic acid, ammonium peroxodisulfate, iron (III) sulfate, ammonium iron (III) sulfate and the like. Even more preferably, hydrogen peroxide is preferable, from the viewpoints of being widely used and inexpensive without depositing metal ions to the surface of the substrate. These oxidizing agents can be used alone or in admixture of two or more kinds.

The content of the oxidizing agent is preferably 0.002% by weight or more, more preferably 0.005% by weight or more, even more preferably 0.007% by weight or more, even more preferably 0.01% by weight or more, of the polishing composition of Embodiment 1, from the viewpoint of increasing the polishing rate. Also, the content is preferably 20% by weight or less, more preferably 15% by weight or less, even more preferably 10% by weight or less, even more preferably 5% by weight or less, of the polishing composition of Embodiment 1, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, even more preferably from 0.007 to 10% by weight, even more preferably from 0.01 to 5% by weight, of the polishing composition of Embodiment 1.

It is preferable that the polishing composition of Embodiment 1 contains an acid and/or a salt thereof, from the viewpoint of increasing the polishing rate. As the acid and/or salt thereof, those compounds of which acidic form has pK1 of 2 or less are preferable. The pK1 is preferably 1.5 or less, more preferably 1 or less, and even more preferably those having such strong acidity which cannot be expressed by pK1 are desirable, from the viewpoint of reducing fine scratches. Examples thereof include an inorganic acid, such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, or amide sulfuric acid, and a salt thereof; organic phosphonic acid, such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, or α-methylphosphonosuccinic acid, and a salt thereof; an aminocarboxylic acid, such as glutamic acid, picolinic acid, or aspartic acid, and a salt thereof; a carboxylic acid, such as oxalic acid, nitroacetic acid, maleic acid, or oxaloacetic acid, and a salt thereof; and the like. Among them, the inorganic acids, the organic phosphonic acids, and salts thereof are preferable, from the viewpoint of reducing the fine scratches. Among the inorganic acid and a salt thereof, nitric acid, sulfuric acid, hydrochloric acid, perchloric acid and salts thereof are more preferable. Among the organic phosphonic acid and a salt thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), and salts thereof are more preferable. These acids and salts thereof can be used alone or in admixture of two or more kinds. Here, pK1 is defined as follows: A logarithmic value of an inverse of an acid dissociation constant (at 25° C.) of an organic compound or an inorganic compound is usually expressed as pKa, and a logarithmic value of an inverse of a first acid dissociation constant is defined as pK1. The pK1 of each compound is listed in, for instance, in *Kagaku*

*Binran (Kiso-hen)* II, Fourth Revision, pp. 316–325 (Edit. by Nippon Kagakukai), and the like. In the present invention, it is even more preferable to use those acids having pK1 of 2 or less and/or a salt thereof, from the viewpoint of satisfying both reduction of fine scratches and increase in the polishing rate.

The salts of these acids are not particularly limited. Examples thereof include salts with a metal, ammonium, an alkylammonium, an organic amine or the like. Concrete examples of the metals include those metals belonging to the Group 1A, 1B, 2A, 2B, 3A, 3B, 4A, 6A, 7A or 8 of the Periodic Table (long period form). Among them, the salt with the metal belonging to Group 1A or with ammonium is preferable, from the viewpoint of reducing the fine scratches.

The content of the above-mentioned acid and the salt thereof is preferably from 0.0001 to 5% by weight, more preferably from 0.0003 to 3% by weight, even more preferably from 0.001 to 2% by weight, even more preferably from 0.0025 to 1% by weight, of the polishing composition of Embodiment 1, from the viewpoint of exhibiting sufficient polishing rate and from the viewpoint of improving the surface quality.

Water in the polishing composition of Embodiment 1 is used as a medium. For instance, distilled water, ion exchanged water or ultrapure water is used. From the viewpoint of efficiently polishing the object to be polished, the water content is preferably 55% by weight or more, more preferably 67% by weight or more, even more preferably 75% by weight or more, even more preferably 84% by weight or more, of the polishing composition of Embodiment 1, and the water content is preferably 99.4979% by weight or less, more preferably 98.9947% by weight or less, even more preferably 96.992% by weight or less, even more preferably 94.9875% by weight or less, of the polishing composition of Embodiment 1. The water content is preferably from 55 to 99.4979% by weight, more preferably from 67 to 98.9947% by weight, even more preferably from 75 to 96.992% by weight, even more preferably from 84 to 94.9875% by weight of the polishing composition of Embodiment 1.

The concentration of each component of the above-mentioned polishing composition may be any of the concentration during the preparation of the composition and the concentration upon use. In many cases, the polishing composition is usually prepared as a concentrate, which is diluted upon use.

In addition, there can be added other component to the polishing composition of Embodiment 1 as occasion demands. The other component includes thickeners, dispersing agents, anticorrosive agents, basic substances, surfactants, and the like.

The polishing composition of Embodiment 1 can be prepared by mixing the above-mentioned abrasive and water, and optionally, an oxidizing agent, an acid and/or a salt thereof, and other components by a known method.

As mentioned above, the polishing composition of Embodiment 2 is a polishing composition for a substrate for a disk containing an abrasive in an aqueous medium, wherein the abrasive contains silica particles having particle sizes of from 5 to 120 nm in an amount of 50% by volume or more, wherein the abrasive contains:

(i) 10 to 70% by volume of small size silica particles having particle sizes of 5 nm or more and less than 40 nm based on the entire amount of the silica particles having particle sizes of from 5 to 120 nm;

(ii) 20 to 70% by volume of intermediate size silica particles having particle sizes of 40 nm or more and less than 80 nm based on the entire amount of the silica particles having particle sizes of from 5 to 120 nm; and (iii) 0.1 to 40% by volume of large size silica particles having particle sizes of 80 nm or more and 120 nm or less based on the entire amount of the silica particles having particle sizes of from 5 to 120 nm.

In Embodiment 2, since the abrasive containing the silica particles having specified particle size distribution as mentioned above is used in an amount equal to or greater than the specified amount, there are exhibited some effects for polishing a memory hard disk that the micropits of the polished object after polishing are remarkably reduced and that the polishing can be carried out economically advantageously. The term "micropits" as used herein is the same as that defined in Embodiment 1.

Therefore, when a polishing composition containing silica particles satisfying both the requirements of the above Embodiment 1 and the requirements of the above Embodiment 2 is used, not only the carrier squeals of the object to be polished during polishing are reduced, but also the micropits can be remarkably reduced.

The abrasive used in Embodiment 2 contains 50% by volume or more of the silica particles having particle sizes of from 5 to 120 nm. The content of the above-mentioned silica particles having particle sizes of from 5 to 120 nm is preferably 55% by volume or more, more preferably 60% by volume or more, from the viewpoint of reducing the micropits, the surface roughness and the scratches.

The silica particles used in Embodiment 2 include, for instance, colloidal silica particles, fumed silica particles, the surface-modified silica particles, and the like. Among them, the colloidal silica particles are preferable, from the viewpoint of being suitable for final finish polishing for a substrate for a high-recording density memory magnetic disk requiring a higher smoothness. The colloidal silica particles can be obtained by a process, for instance, including the step of generating the colloidal silica particles from an aqueous sodium silicate.

The above-mentioned abrasive contains:

(i) 10 to 70% by volume of small size silica particles having particle sizes of 5 nm or more and less than 40 nm based on the entire amount of the silica particles having particle sizes of from 5 to 120 nm;

(ii) 20 to 70% by volume of intermediate size silica particles having particle sizes of 40 nm or more and less than 80 nm based on the entire amount of the silica particles having particle sizes of from 5 to 120 nm; and (iii) 0.1 to 40% by volume of large size silica particles having particle sizes of 80 nm or more and 120 nm or less based on the entire amount of the silica particles having particle sizes of from 5 to 120 nm.

The content of the above-mentioned small size particles is preferably from 12 to 68% by volume, more preferably from 15 to 65% by volume, even more preferably from 20 to 60% by volume, even more preferably from 30 to 60% by volume, from the viewpoint of reducing the micropits. The content of the above-mentioned intermediate size particles is preferably from 25 to 70% by volume, more preferably from 25 to 60% by volume, even more preferably from 30 to 50% by volume, from the viewpoint of reducing the micropits. The content of the above-mentioned large size particles is preferably from 0.5 to 35% by volume, more preferably from 1 to 30% by volume, from the viewpoint of reducing the micropits.

Even more preferably, it is desired that the abrasive used in Embodiment 2 contains:

(i) 5 to 70% by volume, preferably from 10 to 50% by volume, of particles having particle sizes of from 10 to 30 nm in the small size silica particles based on the entire amount of the silica particles having particle sizes of from 5 to 120 nm;

(ii) 20 to 70% by volume, preferably from 22 to 65% by volume, of particles having particle sizes of from 45 to 75 nm in the intermediate size silica particles based on the entire amount of the silica particles having particle sizes of from 5 to 120 nm; and (iii) 0.1 to 25% by volume, preferably from 1 to 15% by volume, of particles having particle sizes of from 90 to 110 nm in the large size silica particles based on the entire amount of the silica particles having particle sizes of from 5 to 120 nm, from the viewpoint of reducing the micropits.

The particle size distribution of the above-mentioned silica particles is determined by the method described below. Specifically, the photographs of the silica particles observed by a transmission electron microscope "JEM-2000 FX" commercially available from JEOL LTD. (80 kV, magnification: 10000 to 50000) are incorporated into a personal computer as image data with a scanner connected thereto. The projected area diameter of each silica particle is determined using an analysis software "WinROOF" (commercially available from MITANI CORPORATION), and considered as the diameter of the silica particles. After analyzing data for 1000 or more silica particles, the volume of the silica particles are calculated from the diameters of the silica particles based on the analyzed data using a spreadsheet software "EXCEL" (commercially available from Microsoft Corporation). First, the ratio (% based volume) of the particles having particles sizes of equal to or greater than 5 nm and equal to or less than 120 nm (simply referred to as particle sizes of from 5 to 120 nm) is calculated, and the ratios (% based volume) of three regions, namely a region of equal to or greater than 5 nm and less than 40 nm (simply referred to as particle sizes of 5 nm or more and less than 40 nm); a region of equal to or greater than 40 nm and less than 80 nm (simply referred to as particle sizes of 40 nm or more and less than 80 nm); and a region of equal to or greater than 80 nm and equal to or less than 120 nm (simply referred to as particle sizes of from 80 to 120 nm), in the entire particles having particles sizes of from 5 to 120 nm are calculated. Similarly, the ratios (% based volume) of the three regions of a region having particle sizes of equal to or greater than 10 nm and equal to or less than 30 nm; a region having particle sizes of equal to or greater than 45 nm and equal to or less than 75 nm; and a region having particle sizes of equal to or greater than 90 nm and equal to or less than 110 nm are also calculated.

The method for adjusting the particle size distribution of the silica particles is not particularly limited. For instance, in the case where the silica particles are colloidal silica particles, the method includes a method of giving the particle size distribution in a final product by adding the particles which can serve as a new core during the process of particle growth in the preparation steps, or the method including the step of mixing two or more silica particles that have different particle size distributions, and the like.

As the abrasive used in Embodiment 2, the abrasives that are generally used for polishing can be used in addition to the above-mentioned silica particles. The kinds of the abrasive, the average primary particle size and the average secondary particle size of the abrasive may be the same as those in the above Embodiment 1.

The content of the abrasive containing silica particles is preferably 0.5% by weight or more, more preferably 1% by weight or more, even more preferably 3% by weight or more, even more preferably 5% by weight or more, of the polishing composition of Embodiment 2, from the viewpoint of increasing the polishing rate, and the content is preferably 20% by weight or less, more preferably 15% by weight or less, even more preferably 13% by weight or less, even more preferably 10% by weight or less, of the polishing composition of Embodiment 2, from the viewpoints of improving the surface quality and having economic advantages. Accordingly, the content is preferably from 0.5 to 20% by weight, more preferably from 1 to 15% by weight, even more preferably from 3 to 13% by weight, even more preferably from 5 to 10% by weight, of the polishing composition of Embodiment 2.

In addition, since the polishing composition of Embodiment 2 further contains at least one member selected from the group consisting of acids, salts thereof and oxidizing agents, more excellent effects of the present invention can be exhibited. These can be used as a mixture.

It is preferable that the polishing composition of Embodiment 2 contains an oxidizing agent from the viewpoint of increasing the polishing rate. The oxidizing agent includes peroxides, permanganic acid or salts thereof, chromic acid or salts thereof, peroxo acid or salts thereof, oxyacid or salts thereof, metal salts, sulfuric acid, and the like. Examples of these oxidizing agents may be the same as those used in the above Embodiment 1. These oxidizing agents can be used alone or in admixture of two or more kinds.

The content of the oxidizing agent is preferably 0.002% by weight or more, more preferably 0.005% by weight or more, even more preferably 0.007% by weight or more, even more preferably 0.01% by weight or more, of the polishing composition of Embodiment 2, from the viewpoint of increasing the polishing rate. Also, the content is preferably 20% by weight or less, more preferably 15% by weight or less, even more preferably 10% by weight or less, even more preferably 5% by weight or less, of the polishing composition of Embodiment 2, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, even more preferably from 0.007 to 10% by weight, even more preferably from 0.01 to 5% by weight, of the polishing composition of Embodiment 2.

It is preferable that the polishing composition of Embodiment 2 contains an acid and/or a salt thereof, from the viewpoint of increasing the polishing rate. Examples of the acid and/or salt thereof may be the same as those used in the above Embodiment 1.

The content of the above-mentioned acid and the salt thereof is preferably from 0.0001 to 5% by weight, more preferably from 0.0003 to 3% by weight, even more preferably from 0.001 to 2% by weight, even more preferably from 0.0025 to 1% by weight, of the polishing composition of Embodiment 2, from the viewpoint of exhibiting sufficient polishing rate and from the viewpoint of improving the surface quality.

Water in the polishing composition of Embodiment 2 is used as a medium. For instance, distilled water, ion exchanged water or ultrapure water is used. From the viewpoint of efficiently polishing the object to be polished, the water content is preferably 55% by weight or more, more preferably 67% by weight or more, even more preferably 75% by weight or more, even more preferably 84% by weight or more, of the polishing composition of Embodiment 2, and the water content is preferably 99.4979% by weight or less, more preferably 98.9947% by weight or less, even more preferably 96.992% by weight or less, even more preferably 94.9875% by weight or less, of the polishing composition of Embodiment 2. The water content is preferably from 55 to 99.4979% by weight, more preferably from 67 to 98.9947% by weight, even more preferably from 75 to 96.992% by weight, even more preferably from 84 to 94.9875% by weight of the polishing composition of Embodiment 2.

The concentration of each component of the above-mentioned polishing composition may be any of the concentration during the preparation of the composition and the concentration upon use. In many cases, the polishing composition is usually prepared as a concentrate, which is diluted upon use.

In addition, there can be added other component to the polishing composition of Embodiment 2 as occasion demands. The other component includes thickeners, dispersing agents, anticorrosive agents, basic substances, surfactants, and the like.

The polishing composition of Embodiment 2 can be prepared by mixing the above-mentioned abrasive, an oxidizing agent, an acid and/or a salt thereof and water, and optionally other components by a known method.

It is preferable that the pH of the polishing composition having the constituents of Embodiments 1 and 2 (hereinafter simply referred to as "polishing composition of the present invention") is appropriately determined depending upon the kinds of the objects to be polished and the properties to be needed. Although the pH of the polishing composition of the present invention cannot be absolutely determined because it differs depending upon the materials of the objects to be polished, it is desirable that the pH generally is acidic, preferably less than 7, more preferably 6 or less, even more preferably 5 or less, even more preferably 4 or less, from the viewpoint of increasing the polishing rate in metal materials. In addition, the pH is preferably 1 or more, more preferably 1.1 or more, even more preferably 1.2 or more, even more preferably 1.3 or more, from the viewpoints of influence to a human body and corrosivity of the machine. Even more preferably in the substrate for precision parts mainly made of a metal such as an aluminum alloy substrate plated with nickel-phosphorus (Ni—P), it is preferable that the pH is acidic from the viewpoint of the polishing rate, and that the pH is preferably 4.5 or less, more preferably 4 or less, even more preferably 3.5 or less, even more preferably 3 or less, from the viewpoint of increasing the polishing rate. Therefore, although the pH may be set in accordance with the purpose which is to be considered important, even more preferably in the substrate for precision parts mainly made of a metal such as an aluminum alloy substrate plated with Ni—P, the pH is preferably from 1 to 4.5, more preferably from 1.1 to 4, even more preferably from 1.2 to 3.5, even more preferably from 1.3 to 3, from the total viewpoints mentioned above. The pH can be adjusted by properly adding an inorganic acid such as nitric acid or sulfuric acid, an organic acid such as oxalic acid, an ammonium salt, a basic substance such as an aqueous ammonia, potassium hydroxide, sodium hydroxide or an amine in a desired amount.

2. Polishing Process for Substrate for Disk

The polishing process for a substrate for a disk with suppressed generation of carrier squeals of the present invention includes a method including the step of applying the polishing composition of the present invention, even more preferably the polishing composition of Embodiment 1, to a substrate to be polished when polishing. In addition, by using the polishing composition of the above Embodiment 2 in this polishing process for a substrate for a disk, the micropits can be even more preferably markedly reduced.

The polishing process for a substrate to be polished includes a polishing process including the step of polishing a substrate to be polished with the polishing composition of the present invention, or polishing a substrate to be polished with the polishing composition prepared by mixing each component so as to have the same composition as the polishing composition of the present invention, and the polishing process can be even more preferably suitably used for the production of a substrate for precision parts, even more preferably a substrate for memory hard disk. In addition, the polishing composition of the present invention can exhibit a high polishing rate, with remarkably suppressing the generation of carrier squeals and/or micropits.

The material for an object to be polished with the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, an object to be polished is preferably made of a metal such as aluminum, nickel, tungsten or copper, or made of an alloy containing these metals as the main components, for instance, an aluminum alloy substrate plated with Ni—P is more preferable, and the aluminum alloy substrate plated with Ni—P is even more preferable.

The polishing process with the polishing composition of the present invention includes, for instance, a process including the step of setting a substrate with polishing platens to which a nonwoven polishing pad made of an organic polymer, is attached; feeding a polishing composition to a polishing surface, and moving the polishing platens or the substrate with applying a given pressure. Since the above-mentioned polishing process is carried out with the polishing composition of the present invention, the generation of carrier squeals and/or micropits is markedly suppressed. Therefore, the present invention relates to a method of reducing micropits including the step of applying the polishing composition of the present invention to a substrate for a disk.

The polishing process of a substrate for a disk, for instance, can be suitably carried out by using a known polishing machine. For instance, the polishing process is carried out by the steps of setting a substrate for a disk between polishing platens to which a nonwoven polishing pad made of an organic polymer and the like, preferably made of polyurethane, is attached; feeding a polishing composition in an amount of from 1 to 30 mL/min, preferably from 3 to 20 mL/min, per one substrate for a disk with a diameter of 95 mm to the surface of a substrate to be polished; moving the polishing platens and the substrate for a disk at a relative rate between an upper platen or a lower platen and a substrate for a disk of usually from 0.1 to 2 m/sec, preferably from 0.3 to 1 m/sec at the center of the platens, with applying a given pressure of usually from 2.9 to 19.6 kPa, preferably from 4.9 to 9.8 kPa as a load.

According to the polishing process for a substrate for a disk as mentioned-above, the polishing of the substrate can be carried out without the generation of carrier squeals and/or micropits causing problems in a practical level, so that a substrate for a disk having the excellent surface smoothness without the surface defects is sufficiently obtained.

3. Method for Manufacturing Substrate for Disk

In addition, as one of embodiment of the present invention, there is provided a method for manufacturing a substrate for a disk including the step of polishing a substrate for a disk with the polishing composition of the present invention, even more preferably a method for manufacturing a substrate for a disk including the step of polishing an Ni—P plated substrate with the polishing composition of the present invention.

The method for manufacturing an Ni—P plated substrate for a disk of the present invention (hereinafter referred to as the method for manufacturing a substrate for a disk), includes the step of polishing the substrate with the polishing composition of the present invention. This step is preferably carried out in the second step or subsequent steps among the plural polishing step, and more preferably in the final polishing step. For instance, the above-mentioned substrate for a disk (for instance, Ni—P plated aluminum alloy substrate) having a surface roughness (Ra) of from 0.5 to 1.5 nm and a waviness (Wa) of from 0.5 to 1.5 nm obtained in the first polishing step or the second polishing step, in which the polishing slurry containing alumina abrasive grains as abrasives, is used, is further polished by the polishing process with the polishing composition of the present invention.

In the method for manufacturing a substrate for a disk of the present invention, when it is desired to manufacture an Ni—P plated substrate for a disk with effective reduction of micropits without the generation of carrier squeals, in the polishing process including only two steps, where the first step is carried out by polishing with alumina abrasive grains, the polishing process for a substrate for a disk with the polishing composition of the present invention is suitably applied as the second polishing step.

According to the method for manufacturing a substrate for disk of the present invention, there can be efficiently manufactured an Ni—P plated substrate for a disk polished with the polishing composition of the present invention to have an excellent surface smoothness, in which the micropits are effectively reduced.

The manufactured substrate has excellent surface smoothness in addition to the remarkable reduction in the micropits. As the surface smoothness, it is desired that the surface roughness (Ra) is 0.3 nm or less, preferably 0.25 nm or less, and that the waviness (Wa) is 0.3 nm or less, preferably 0.25 nm or less.

The above-mentioned polishing process explained in the method for manufacturing a substrate for a disk of the present invention, refers to the polishing process which is even more preferable to apply the polishing composition of the present invention, but it can be similarly applied to the other polishing steps, for instance, lapping process, and the like.

EXAMPLES

The following examples further describe and demonstrate embodiments of the present invention. The examples are given solely for the purposes of illustration and are not to be construed as limitations of the present invention.

(Object to be Polished)

Each of the polishing compositions obtained in the following Examples and Comparative Examples was evaluated for its polishing properties by using an Ni—P plated, aluminum alloy substrate which was previously roughly polished with a polishing slurry containing alumina abrasives so that the substrate had a surface roughness (Ra) of 1 nm, a thickness of 1.27 mm, and a diameter of 95 mm as a substrate to be polished.

Examples I-1 to I-5 and Comparative Examples I-1 to I-5

There were added together the colloidal silicas (Silicas A to I), hydrogen peroxide ($H_2O_2$), HEDP (1-hydroxyethylidene-1,1-diphosphonic acid) and balance water (ion-exchanged water) as listed in Table 1 with mixing, to give each of the polishing compositions having the composition as shown in Table 1. The order of adding is as follows: A 35% by weight aqueous hydrogen peroxide was added to an aqueous solution prepared by diluting HEDP in water, thereafter other components were added thereto as desired, and a colloidal silica slurry was finally added to the mixture obtained with cautiously stirring not to cause gelation, to give a polishing composition.

TABLE 1

| | Composition of Polishing Composition (% by weight) | | | | | | | | | | | |
|---|---|---|---|---|---|---|---|---|---|---|---|---|
| | Silica A | Silica B | Silica C | Silica D | Silica E | Silica F | Silica G | Silica H | Silica I | $H_2O_2$ | HEDP | pH |
| Ex. No. | | | | | | | | | | | | |
| Ex. I-1 | — | — | — | 3.00 | — | — | — | 6.00 | — | 0.3 | 0.42 | 2.3 |
| Ex. I-2 | — | 1.35 | — | — | 6.30 | — | 1.35 | — | — | 0.3 | 0.40 | 2.3 |
| Ex. I-3 | — | 1.35 | — | — | — | 6.30 | 1.35 | — | — | 0.3 | 0.40 | 2.2 |
| Ex. I-4 | 1.58 | 1.58 | 2.25 | 2.25 | — | — | 1.35 | — | — | 0.3 | 0.40 | 2.3 |
| Ex. I-5 | — | 1.01 | — | 6.98 | — | — | 1.01 | — | — | 0.3 | 0.40 | 2.1 |
| Comp. Ex. No. | | | | | | | | | | | | |
| Comp. Ex. I-1 | 9.00 | — | — | — | — | — | — | — | — | 0.3 | 0.40 | 2.2 |
| Comp. Ex. I-2 | — | 9.00 | — | — | — | — | — | — | — | 0.3 | 0.40 | 2.2 |

TABLE 1-continued

| | Composition of Polishing Composition (% by weight) | | | | | | | | | | | |
|---|---|---|---|---|---|---|---|---|---|---|---|---|
| | Silica A | Silica B | Silica C | Silica D | Silica E | Silica F | Silica G | Silica H | Silica I | $H_2O_2$ | HEDP | pH |
| Comp. Ex. I-3 | — | — | — | — | — | — | — | — | 9.00 | 0.3 | 0.42 | 2.2 |
| Comp. Ex. I-4 | — | — | 9.00 | — | — | — | — | — | — | 0.3 | 0.40 | 2.2 |
| Comp. Ex. I-5 | — | — | — | 9.00 | — | — | — | — | — | 0.3 | 0.40 | 2.1 |

*Notes from Table 1
Silica A: Cataloid SI-30 (commercially available from CATALYSTS & CHEMICALS INDUSTRIES CO., LTD.)
Silica B: Cataloid SI-40 (commercially available from CATALYSTS & CHEMICALS INDUSTRIES CO., LTD.)
Silica C: Cataloid SI-50 (commercially available from CATALYSTS & CHEMICALS INDUSTRIES CO., LTD.)
Silica D: Cataloid SI-45P (commercially available from CATALYSTS & CHEMICALS INDUSTRIES CO., LTD.)
Silica E: Laboratory sample from CATALYSTS & CHEMICALS INDUSTRIES CO., LTD.
Silica F: Laboratory sample from CATALYSTS & CHEMICALS INDUSTRIES CO., LTD.
Silica G: Cataloid SI-80P (commercially available from CATALYSTS & CHEMICALS INDUSTRIES CO., LTD.)
Silica H: Syton 524 (commercially available from Du Pont K.K.)
Silica I: Syton HS40 (commercially available from Du Pont K.K.)
HEDP: 1-Hydroxyethylidene-1,1-diphosphonic acid "Dequest 2010" (commercially available from SOLUTIA JAPAN INC.)
$H_2O_2$: 35% by weight aqueous hydrogen peroxide (commercially available from ASAHI DENKA KOGYO K.K.)

Figure 1:
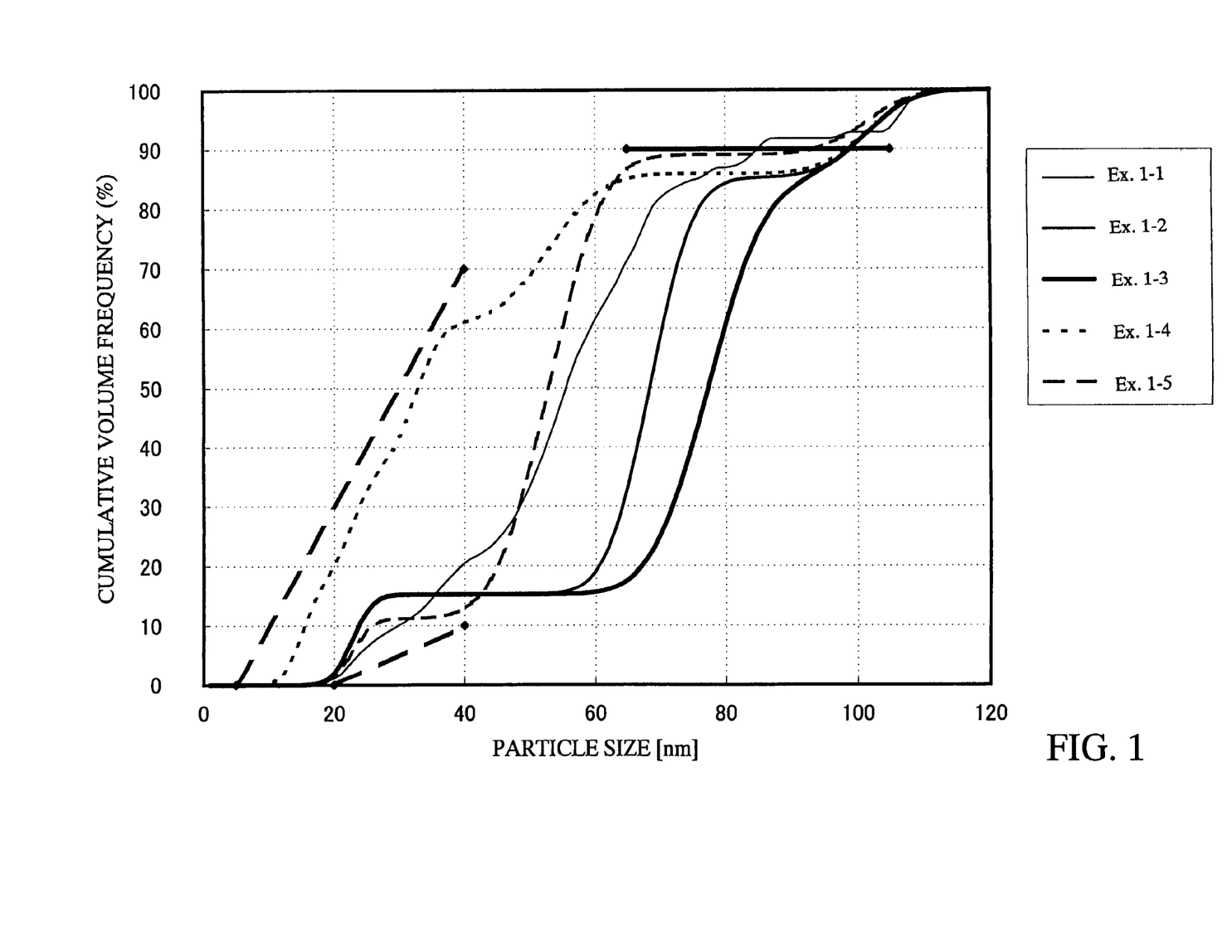
FIG. 1 is a graph for particle size-cumulative volume frequency of silica particles used in each Example.
Figure 2:
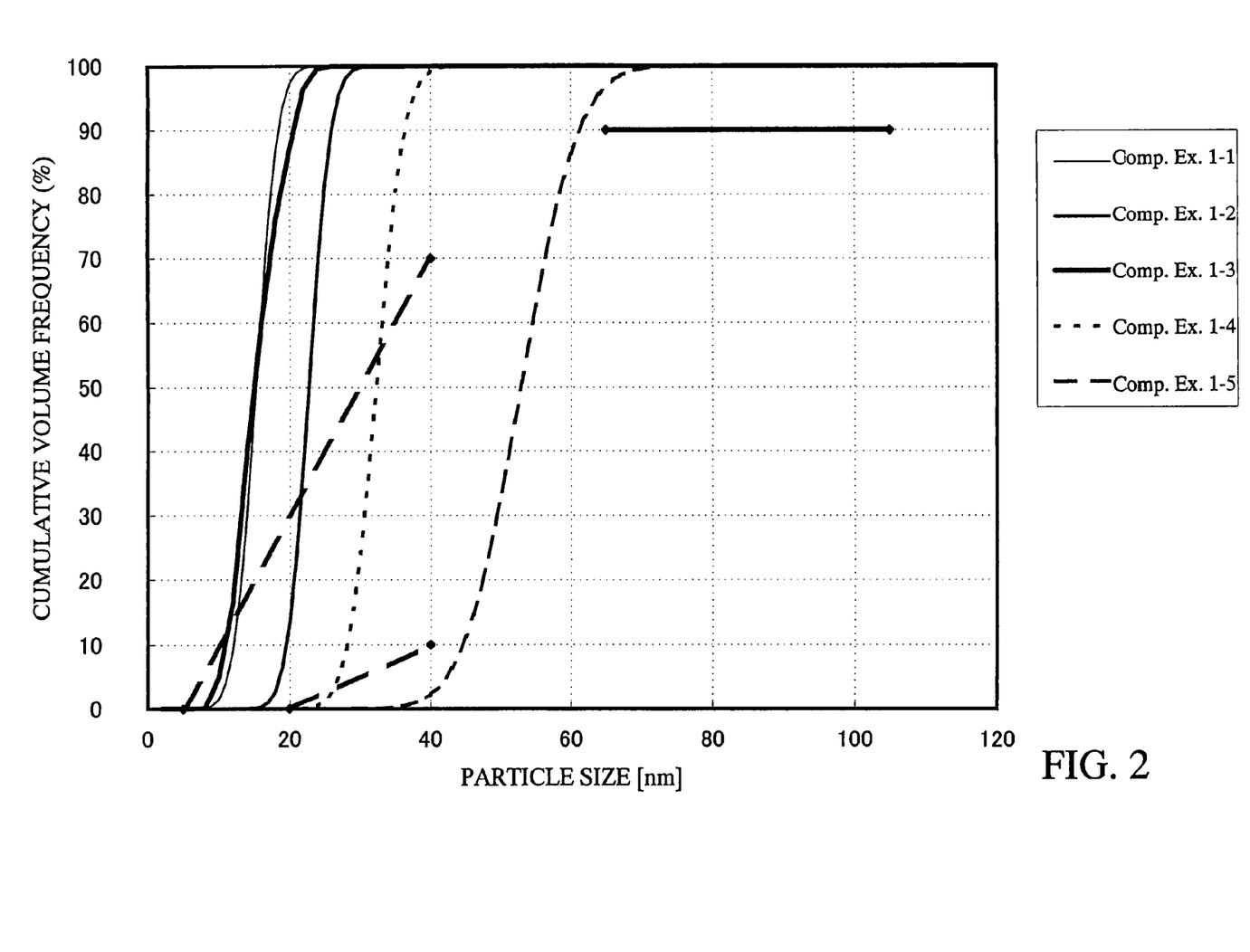
FIG. 2 is a graph for particle size-cumulative volume frequency of silica particles used in each Comparative Example.

With regard to each of the silica particles constituting the above-mentioned Silicas A to I or a mixture thereof used in the preparation of the above-mentioned polishing composition, the particle size of the silica particles was determined in accordance with the following method for [Determination of Particle Size Distribution of Silica Particles]. The cumulative volume frequency of the particle size was obtained, and a graph of particle size-cumulative volume frequency was plotted. The graph of the particle size-cumulative volume frequency of the silica particles used in each of Examples is shown in FIG. 1, and the graph of the particle size-cumulative volume frequency of the silica particles used in each of Comparative Examples is shown in FIG. 2.

[Determination of Particle Size Distribution of Silica Particles]

Using silica particles in the form of slurry as a sample, the sample was observed with a transmission electron microscope "JEM-2000FX" commercially available from JEOL, LTD. (80 kV, magnification: 10000 to 50000 times) in accordance with the instruction manual attached by the manufacturer of the microscope, and its TEM image was photographed. Each of the photographs was incorporated into a personal computer as image data with a scanner connected thereto. The projected area diameter of individual silica particles was determined using an analysis software "WinROOF" (commercially available from MITANI CORPORATION), and considered as the diameter of silica particles. After analyzing data for 1000 or more silica particles, the volume of silica particles were calculated from the diameters of the silica particles based on the analyzed data using a spreadsheet software "EXCEL" (commercially available from Microsoft Corporation).

On the bases of the particle size distribution data of the silica particles obtained as described above, a proportion (% on volume basis) of the particles having a given particle size is expressed as a cumulative frequency of the silica particles counted from a small particle size side in the entire particles, to give a cumulative volume frequency (%).

On the bases of the particle sizes of the silica particles and the data for the cumulative volume frequency obtained as described above, the cumulative volume frequency was plotted against the particle size, to give a graph of particle size-cumulative volume frequency.

In addition, an object to be polished was polished with each of the polishing compositions of Examples I-1 to I-5 and Comparative Examples I-1 to I-5 under the following polishing conditions. During polishing, the presence or absence of the generation of the carrier squeals was judged in accordance with the following method. In addition, in accordance with the following methods, the polishing rate was obtained and at the same time the presence or absence of the micropits of the object to be polished was evaluated. The evaluation was made on 10 objects to be polished for each of Examples and Comparative Examples, and the results are an average of individual data obtained with each of objects to be polished. The results are shown in Table 2.

(Polishing Conditions)
Polishing testing machine: "Double-Sided Processing Machine, Model 9B," commercially available from SPEEDFAM CO., LTD.
Polishing pad: "Bellatrix N0058" manufactured by Kanebo, LTD.
Processing pressure: 7.8 kPa
Feeding amount for a slurry: 40 mL/min
Rotational speed of a lower platen: 30 r/min
Polishing time period: 4 minutes
Number of substrates introduced: 10

[Judgment of Generation of Carrier Squeals]

During the period of from immediately after the start of the polishing to the end of polishing, the noise generated from the surrounding of the rotating platens (carrier) of the polishing test machine was evaluated in accordance with the following evaluation criteria in order to judge the presence or absence of the generation of the carrier squeals. ○ means that there is no generation of the carrier squeals; and x means that there is generation of the carrier squeals, respectively.

Evaluation Criteria

○: usual sliding noise during polishing being recognized; and

X: frictional noise of "squeak, squeak," not the above sliding noise being recognized.

[Determination of Micropits]

Figure 3:
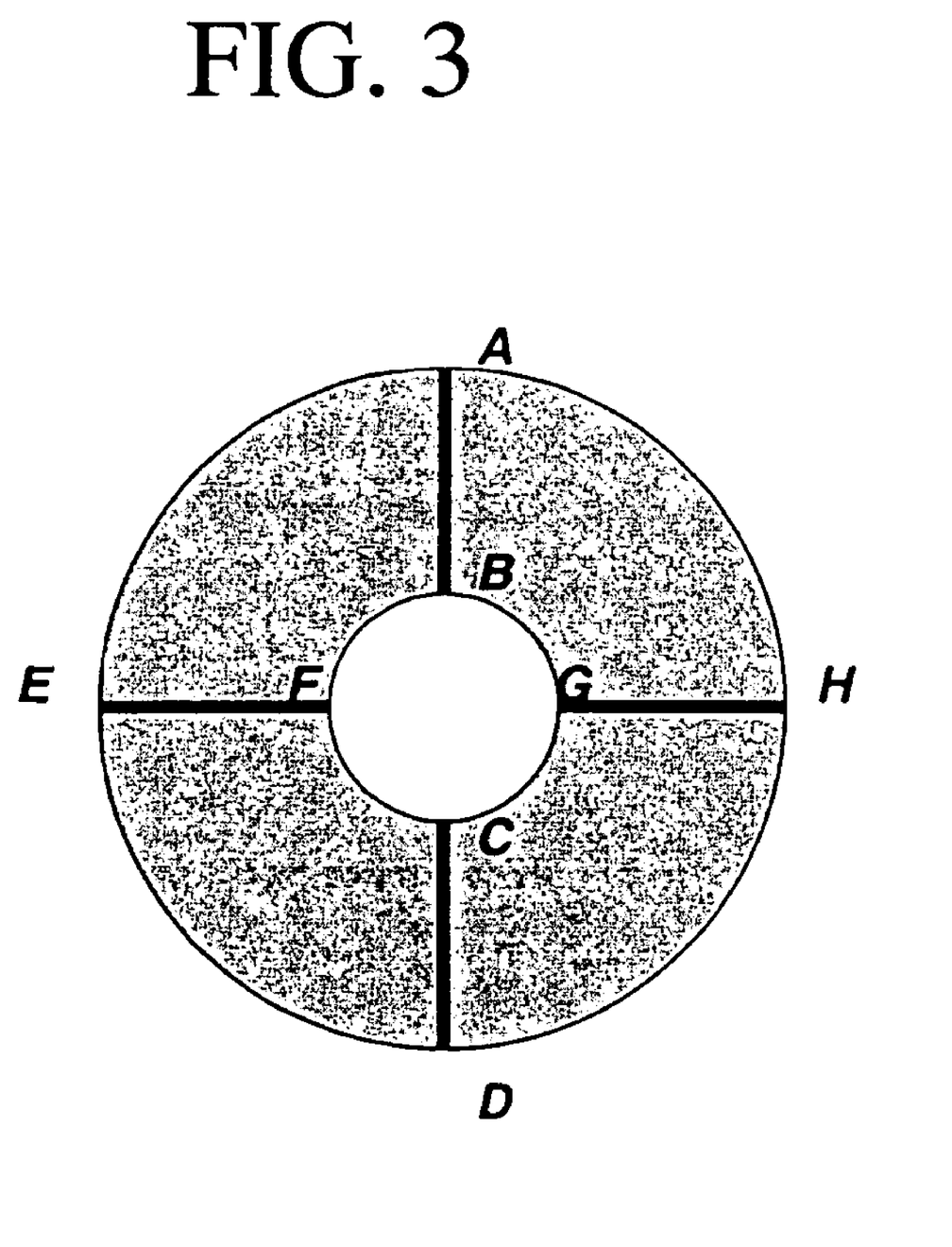
FIG. 3 is a schematic view showing the sites on the substrate scanned by a differential interference microscope in the determination of micropits.

Front and back sides of 5 substrates were observed with a differential interference microscopic system [metal microscope "BX60M" (commercially available from OLYMPUS OPTICAL Co., Ltd.), magnification: 50 times (eyepiece: 10 times, objective lens: 5 times)], and the number of micropits were counted, with scanning along line segments AB, CD, EF, GH as shown in FIG. 3. The results obtained in accordance with the following evaluation criteria are shown in Table 2.

Evaluation Criteria

"": less than 0.3 micropits/side;

"○": 0.3 or more and less than 1 micropit/side;

"Δ": 1 or more and less than 5 micropits/side;

"X": 5 or more and less than 20 micropits/side;

"XX": 20 or more and less than 100 micropits/side; and

"XXX": 100 or more micropits/side.

Here, a substrate can be usually said to be a practically usable level if the substrate having the number of micropits is "less than 100 micropits/side." In the present invention, however, those having a fewer number of micropits of "less than 5 micropits/side," namely those ranked "," "○" and "Δ" in the above evaluation, are considered acceptable products.

[Calculation of Polishing Rate]

A weight difference (g) of an object to be polished before and after the polishing was divided by specific gravity (8.4 g/cm$^3$), and the resulting product was divided by a surface area (65.97 cm$^2$) and a polishing time (minute), to calculate a double-sided polished amount per unit time, and this amount is defined as the polishing rate (μm/minute).

TABLE 2

| Ex. No. | D90 (nm) | Carrier Squeals | Micropits | Polishing Rate (μm/minute) |
|---|---|---|---|---|
| Ex. I-1 | 83.9 | ○ | ○ | 0.083 |
| Ex. I-2 | 98.9 | ○ | ○ | 0.072 |
| Ex. I-3 | 98.9 | ○ | Δ | 0.071 |
| Ex. I-4 | 98.4 | ○ | ○ | 0.091 |
| Ex. I-5 | 93.4 | ○ | Δ | 0.077 |
| Comp. Ex. No. | | | | |
| Comp. Ex. I-1 | 18.5 | X | XXX | — |
| Comp. Ex. I-2 | 26.0 | X | XXX | — |
| Comp. Ex. I-3 | 20.6 | X | XXX | 0.045 |
| Comp. Ex. I-4 | 36.4 | X | XXX | 0.047 |
| Comp. Ex. I-5 | 61.3 | ○ | XXX | 0.054 |

It can be seen from the results of Table 2 that the polishing compositions of Examples I-1 to I-5 can sufficiently suppress generation of carrier squeals so 5 that the object to be polished can be polished at higher polishing rates as compared to those of Comparative Examples I-1 to I-5, whereby polished objects without micropits can be obtained.

Examples II-1 to II-4 and Comparative Examples II-1 to II-9

There were added together Silicas A to G, hydrogen peroxide (H$_2$O$_2$), HEDP and balance water (ion-exchanged water) as listed in Table 3 with mixing, to give each of the polishing compositions having the composition as shown in Table 3. The order of adding is as follows: A 35% by weight aqueous hydrogen peroxide was added to an aqueous solution prepared by diluting HEDP in water, thereafter other components were added thereto as desired, and a colloidal silica slurry was finally added to the mixture obtained with cautiously stirring not to cause gelation, to give a polishing composition. Here, the particle size distribution of the silica particles contained in the abrasive of each of the resulting polishing compositions is shown in Table 4.

TABLE 3

| | Composition of Polishing Composition (% by weight) | | | | | | | | | |
|---|---|---|---|---|---|---|---|---|---|---|
| | Silica A | Silica B | Silica C | Silica D | Silica E | Silica F | Silica G | H$_2$O$_2$ | HEDP | pH |
| Ex. No. | | | | | | | | | | |
| Ex. II-1 | 9.00 | — | — | — | — | — | — | 0.3 | 0.43 | 2.2 |
| Ex. II-2 | — | — | 1.35 | 5.40 | — | — | 2.25 | 0.3 | 0.43 | 2.0 |
| Ex. II-3 | — | — | 1.35 | 6.30 | — | — | 1.35 | 0.3 | 0.43 | 2.0 |
| Ex. II-4 | — | — | 1.35 | 6.30 | — | 1.35 | — | 0.3 | 0.43 | 2.0 |
| Comp. Ex. No. | | | | | | | | | | |
| Comp. Ex. II-1 | — | 2.25 | 6.75 | — | — | — | — | 0.3 | 0.43 | 2.0 |
| Comp. Ex. II-2 | — | 9.00 | — | — | — | — | — | 0.3 | 0.43 | 2.0 |
| Comp. Ex. II-3 | — | — | — | 7.65 | — | — | 1.35 | 0.3 | 0.43 | 2.0 |
| Comp. Ex. II-4 | — | — | — | 6.75 | — | — | 2.25 | 0.3 | 0.43 | 2.0 |
| Comp. Ex. II-5 | — | — | 6.92 | — | 1.73 | — | 0.35 | 0.3 | 0.43 | 2.0 |
| Comp. Ex. II-6 | — | — | — | 7.20 | — | 1.80 | — | 0.3 | 0.43 | 2.0 |
| Comp. Ex. II-7 | — | — | — | 4.50 | 4.50 | — | — | 0.3 | 0.43 | 2.0 |

TABLE 3-continued

| | Composition of Polishing Composition (% by weight) | | | | | | | | | |
|---|---|---|---|---|---|---|---|---|---|---|
| | Silica A | Silica B | Silica C | Silica D | Silica E | Silica F | Silica G | $H_2O_2$ | HEDP | pH |
| Comp. Ex. II-8 | — | — | 7.20 | — | 1.80 | — | — | 0.3 | 0.43 | 2.0 |
| Comp. Ex. II-9 | — | — | 1.80 | — | 7.20 | — | — | 0.3 | 0.43 | 2.0 |

In Table 3,
HEDP is 1-hydroxyethylidene-1,1-diphosphonic acid, "Dequest 2010" (commercially available from SOLUTIA JAPAN INC.);
$H_2O_2$ is a 35% by weight aqueous hydrogen peroxide (commercially available from ASAHI DENKA KOGYO K.K.);
Silica A is Syton 520 (commercially available from Du Pont K.K.);
Silica B is Silicadol 30G (commercially available from Nippon Chemical Industrial CO., LTD.);
Silica C is Cataloid SI-80P (commercially available from CATALYSTS & CHEMICALS INDUSTRIES CO., LTD.);
Silica D is Cataloid SI-45P (commercially available from CATALYSTS & CHEMICALS INDUSTRIES CO., LTD.);
Silica B is Cataloid SI-50 (commercially available from CATALYSTS & CHEMICALS INDUSTRIES CO., LTD.);
Silica F is Cataloid SI-40 (commercially available from CATALYSTS & CHEMICALS INDUSTRIES CO., LTD.); and
Silica G is Cataloid SI-30 (commercially available from CATALYSTS & CHEMICALS INDUSTRIES CO., LTD.).

Next, a substrate to be polished was polished with each of the resulting polishing compositions as described as follows. The presence or absence of the micropits on the substrate, the presence or absence of the carrier squeals and the polishing rate were evaluated. These determinations and evaluations were carried out on the same manner as described above except that the polishing was carried out under the following conditions:

(Polishing Conditions)
Polishing testing machine: double-sided processing machine, Model 9B, commercially available from SPEEDFAM CO., LTD.
Polishing pad: "Bellatrix N0058" manufactured by Kanebo, LTD.
Rotational speed of platens: 32.5 r/min
Feeding amount for a slurry: 40 mL/min
Polishing time period: 4 minutes
Polishing pressure: 7.8 kPa
Number of substrates introduced: 10
The results are shown in Table 4.

TABLE 4

| | Amount of Particles of 5–120 nm in Entire Silica Particles*[)] | Particles of 5 nm or more and less than 40 nm | Particles of 40 nm or more and less than 80 nm | Particles of 80–120 nm | Particles of 10–30 nm | Particles of 45–75 nm | Particles of 90–110 nm | Micropits | Carrier Squeals | Polishing Rate (μm/min) |
|---|---|---|---|---|---|---|---|---|---|---|
| Ex. No. | | | | | | | | | | |
| Ex. II-1 | 69.4 | 32.0 | 41.5 | 26.5 | 12.3 | 30.5 | 13.2 | ⊚ | ○ | 0.093 |
| Ex. II-2 | 99.9 | 26.8 | 58.6 | 14.6 | 25.7 | 54.4 | 13.0 | ○ | ○ | 0.090 |
| Ex. II-3 | 99.9 | 16.8 | 69.0 | 14.2 | 15.6 | 64.0 | 12.7 | ○ | ○ | 0.077 |
| Ex. II-4 | 99.9 | 16.1 | 69.4 | 14.5 | 14.9 | 64.5 | 12.9 | ○ | ○ | 0.083 |
| Comp. Ex. No. | | | | | | | | | | |
| Comp. Ex. II-1 | 99.9 | 0.0 | 20.9 | 79.1 | 0.0 | 16.5 | 66.6 | XXX | ○ | 0.085 |
| Comp. Ex. II-2 | 100.0 | 0.1 | 79.6 | 20.4 | 0.0 | 62.9 | 3.6 | X | ○ | 0.055 |
| Comp. Ex. II-3 | 100.0 | 16.9 | 83.1 | 0.0 | 15.5 | 77.1 | 0.0 | X | ○ | 0.067 |
| Comp. Ex. II-4 | 100.0 | 27.0 | 73.0 | 0.0 | 25.7 | 67.8 | 0.0 | X | ○ | 0.077 |
| Comp. Ex. II-5 | 99.9 | 23.3 | 0.4 | 76.3 | 7.2 | 0.0 | 68.0 | X | ○ | 0.053 |
| Comp. Ex. II-6 | 100.0 | 22.0 | 78.0 | 0.0 | 20.6 | 72.4 | 0.0 | X | ○ | 0.054 |
| Comp. Ex. II-7 | 100.0 | 49.5 | 50.5 | 0.0 | 7.7 | 46.1 | 0.0 | X | ○ | 0.052 |
| Comp. Ex. II-8 | 99.9 | 20.0 | 0.4 | 79.6 | 3.2 | 0.0 | 70.9 | XX | ○ | 0.054 |
| Comp. Ex. II-9 | 99.9 | 79.0 | 1.4 | 19.6 | 12.5 | 0.0 | 17.5 | X | X | 0.042 |

Note
*[)]The percentage of the amount in the table is expressed as % by volume.

It can be seen from the results of Table 4 that all of the polishing compositions obtained in Examples II-1 to II-4 exhibit remarkably excellent effect of reducing the micropits as compared to those of the polishing compositions obtained in Comparative Examples II-1 to II-9. Also, it can be seen that all of the polishing compositions obtained in Examples II-1 to II-4 do not generate carrier squeals and have excellent polishing rates.

According to the polishing composition of the present invention, the generation of the carrier squeals and/or the micropits in the polishing process is suppressed, whereby a substrate for a disk having an excellent surface smoothness without surface defects can be efficiently obtained.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition for a substrate for memory hard disk comprising an abrasive in an aqueous medium, wherein the abrasive comprises silica particles having particle sizes of from 5 to 120 nm in an amount of 50% by volume or more, wherein the abrasive comprises:
   (i) 10 to 70% by volume of small size silica particles having particle sizes of 5 nm or more and less than 40 nm based on an entire amount of the silica particles having particle sizes of from 5 to 120 nm;
   (ii) 20 to 70% by volume of intermediate size silica particles having particle sizes of 40 nm or more and less than 80 nm based on an entire amount of the silica particles having particle sizes of from 5 to 120 nm; and
   (iii) 0.1 to 40% by volume of large size silica particles having particle sizes of 80 nm or more and 120 nm or less based on an entire amount of the silica particles having particle sizes of from 5 to 120 nm.

2. A polishing composition for a substrate for memory hard disk comprising an abrasive in an aqueous medium, wherein the abrasive comprises silica particles having particle sizes of from 5 to 120 nm in an amount of 50% by volume or more, wherein the abrasive comprises:
   (i) 5 to 70% by volume of small size silica particles having particle sizes of from 10 to 30 nm based on an entire amount of the silica particles having particle sizes of from 5 to 120 nm;
   (ii) 20 to 70% by volume of intermediate size silica particles having particle sizes of from 45 to 75 nm based on an entire amount of the silica particles having particle sizes of from 5 to 120 nm; and
   (iii) 0.1 to 25% by volume of large size silica particles having particle sizes of from 90 to 110 nm based on an entire amount of the silica particles having particle sizes of from 5 to 120 nm.

3. The polishing composition according to claim 1, wherein the silica particles are colloidal silica particles.

4. The polishing composition according to claim 2, wherein the silica particles are colloidal silica particles.

5. The polishing composition according to claim 1, further comprising at least one member selected from the group consisting of acids, salts thereof and oxidizing agents.

6. The polishing composition according to claim 1, wherein a pH thereof is from 1 to 4.5.

* * * * *